United States Patent [19]
Asai et al.

[11] Patent Number: 5,825,985
[45] Date of Patent: *Oct. 20, 1998

[54] THERMAL PRINTER AND THERMAL PRINTER HEAD DRIVING SYSTEM

[75] Inventors: Tamotsu Asai, Kagoshima-ken; Minoru Suzuki, Tokyo; Kiyoshi Negishi, Tokyo; Katsumi Kawamura, Tokyo; Mikio Horie, Tokyo; Hiroshi Orita, Tokyo; Katsuyoshi Suzuki, Tokyo, all of Japan

[73] Assignee: Asahi Kogaku Kogyo Kabushiki Kaisha, Tokyo, Japan

[ * ] Notice: The term of this patent shall not extend beyond the expiration date of Pat. No. 5,677,721.

[21] Appl. No.: 473,920

[22] Filed: Jun. 7, 1995

[30] Foreign Application Priority Data

Jun. 8, 1994 [JP] Japan ................................. 6-150305

[51] Int. Cl.⁶ ............................ B41B 15/00; B41J 15/00; G06F 15/00; H04N 1/21
[52] U.S. Cl. ...................... 395/108; 358/296; 358/503; 347/190; 346/76.1
[58] Field of Search ........................... 395/108; 358/296, 358/298, 503; 347/188, 190; 400/120.1, 120.01; 346/76.1

[56] References Cited

U.S. PATENT DOCUMENTS

| | | |
|---|---|---|
| 4,216,481 | 8/1980 | Hakoyama ..................... 346/76 PH |
| 4,246,587 | 1/1981 | Reilly et al. ..................... 346/76 PH |
| 4,284,876 | 8/1981 | Ishibashi et al. .................. 219/216 |
| 4,309,712 | 1/1982 | Iwakura .......................... 346/76 PH |
| 4,364,063 | 12/1982 | Anno et al. ..................... 346/76 PH |
| 4,415,907 | 11/1983 | Suemori ......................... 346/76 PH |
| 4,415,908 | 11/1983 | Sugiura .......................... 346/76 PH |
| 4,464,669 | 8/1984 | Sekiya et al. ................... 346/76 PH |
| 4,500,891 | 2/1985 | Gimel et al. .................... 346/76 PH |
| 4,524,368 | 6/1985 | Inui et al. ....................... 346/76 PH |
| 4,688,051 | 8/1987 | Kawakami et al. ............... 346/76 PH |
| 4,761,659 | 8/1988 | Negishi ............................ 346/108 |
| 4,879,459 | 11/1989 | Negishi ............................ 250/205 |
| 4,983,989 | 1/1991 | Komuro et al. .................. 346/1.1 |
| 5,072,237 | 12/1991 | Takaoka ......................... 346/76 PH |
| 5,109,255 | 4/1992 | Nishikawa et al. .............. 355/285 |
| 5,157,761 | 10/1992 | Hawkes .......................... 395/107 |
| 5,353,043 | 10/1994 | Akiyama ......................... 346/76 PH |
| 5,408,483 | 4/1995 | Kasai et al. ...................... 372/31 |
| 5,429,441 | 7/1995 | Schulz et al. ..................... 395/108 |
| 5,469,203 | 11/1995 | Hauschild ........................ 358/298 |
| 5,677,721 | 10/1997 | Suzuki et al. ................... 347/190 |

Primary Examiner—Kim Yen Vu
Assistant Examiner—Kimberly A. Williams
Attorney, Agent, or Firm—Greenblum & Bernstein P.L.C.

[57] ABSTRACT

A thermal printer for forming an image on a sheet includes a thermal head having a plurality of linearly arranged thermal elements. A total number of thermal elements to be energized to form the line image is determined. A difference between the total thermal elements to be energized to form the line image, and previous number of the thermal elements that were energized to form a previous line image is calculated. The thermal elements are then driven for a period of time which is a function of the difference between the total number and the previous number that was calculated.

18 Claims, 5 Drawing Sheets

THERMAL PRINTER AND THERMAL PRINTER HEAD DRIVING SYSTEM

BACKGROUND OF THE INVENTION

The present invention relates to a thermal printer which performs an imaging operation by energizing linearly arranged thermal elements of a printing head.

Conventionally, thermal printers have a printing head with linearly arranged thermal elements energized to form an image on a thermosensitive paper. Generally, the thermal elements are divided into a plurality of groups, with each group of thermal elements being energized separately. By feeding the thermosensitive paper at a predetermined speed, and energizing each group of thermal elements at predetermined time intervals, a two-dimensional image is formed on the paper.

In this type of thermal printer, if the thermal elements required to print a line has a higher printing ratio (i.e., a large number of the thermal elements are to be energized) than the printing ratio required to print the previous line, then a sticking phenomenon may occur. The ticking phenomenon is a condition here the thermosensitive paper sticks to the thermal head as a result of a large number of the thermal elements being energized simultaneously. When sticking occurs, the portion of the image having a high printing ratio becomes too dark. Further, the paper feeds unevenly and the printed image has an uneven thickness.

SUMMARY OF THE INVENTION

It is therefore an object of the present invention to provide an improved thermal printer which prevents the thermosensitive paper from sticking to the thermal head, even if the printing ratio of a line to be printed is higher than the printing ratio of a previously printed line, or if the thermal elements are energized simultaneously.

According to an aspect of the present invention, there is provided a thermal printer for forming an image on a sheet. The thermal printer includes a thermal head having a plurality of linearly arranged thermal elements. A driving mechanism drives the thermal elements to form a line image. A determining mechanism determines a total number of the thermal elements to be energized to form the line image. A difference between the number of the thermal elements to be energized to form the line image, and the number of the thermal elements that were energized to form a previous line image is calculated. The driving mechanism then drive the thermal elements for a period of time, the period of time being a function of the difference between the first number and the second number that was calculated.

Therefore, the time period that the thermal elements are driven is related to the difference in the number of elements driven to form a line to be printed and the number of elements driven to form the previously printed line.

The image to be printed has a plurality of lines, with each of the lines having a plurality of groups of image data. Further, the thermal elements are arranged in a plurality of groups,. with each..group of thermal elements being driven in accordance with a corresponding group of image data.

The thermal elements in each group are energized simultaneously, thereby increasing the speed at which the line image is formed. Further, the number of thermal elements to be energized simultaneously when printing the line image corresponds to the printing ratio of the image data.

In a preferred embodiment, when the first number of thermal elements to be energized to print the line image to be printed is less than the second number of thermal elements to print the previous line image, the thermal elements are energized for a predetermined period of time. Since the printing ratio of the line to be printed in lower than the printing ratio of the previously printed line, then the sticking problem will not occur and the thermal elements may be driven for a predetermined period of time in order to form an image having the correct tonal saturation.

Conversely, when the printing ratio of the line to be printed is higher than the printing ratio of the Line printed previously the thermal elements are energized for less than the predetermined period of time. The sticking problem can therefore be prevented by reducing the time that the thermal elements are energized.

Optionally, a strobe pulse is used to control the energization of the thermal elements. Therefore, by varying the width of the strobe pulse, the time period that the thermal elements is driven can also be varied.

According to another aspect of the present invention, there is provided a method for forming an image on a sheet by driving a thermal head having a plurality of linearly arranged thermal elements, the image having a plurality of line image data. The method includes the steps of determining a total number of the thermal elements to be energized to form the line image; calculating a difference between a first number of the thermal elements to be energized to form the line image and a second number of the thermal elements that were energized to form a previous line image; and driving the thermal elements for a period of time to form the line image, where the period of time is function of the difference between the first number and the second number calculated in the calculating step.

BRIEF DESCRIPTION OF THE DRAWINGS

FIG. 3 shows a structure of a thermal head of the thermal printer shown in. FIG. 1;

DESCRIPTION OF THE EMBODIMENTS

Figure 1:
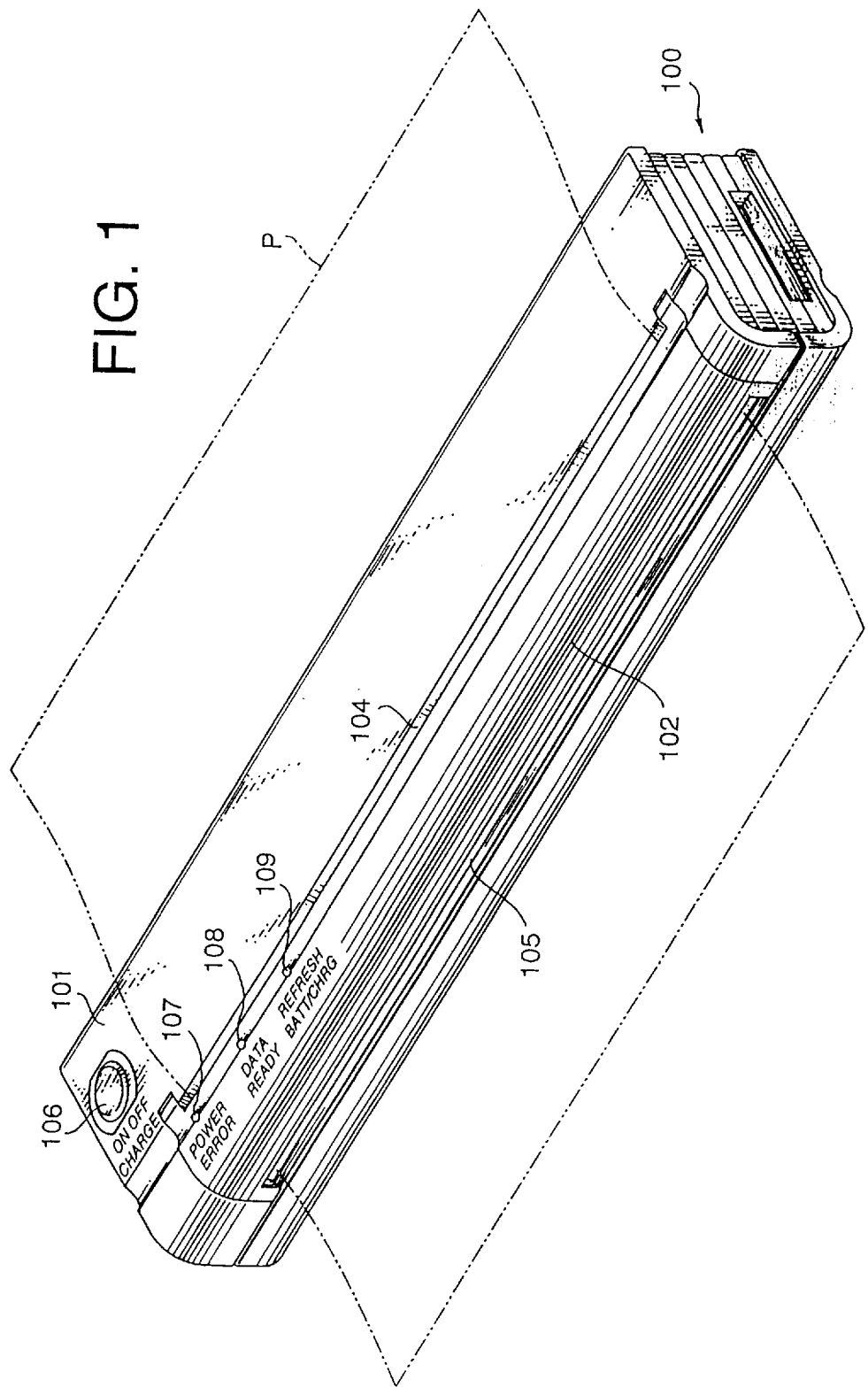
FIG. 1 shows a perspective view of a thermal printer embodying the present invention.

FIG. 1 is a perspective view of a thermal printer 100 embodying the mode control system according to the present invention. The thermal printer 100 has a main housing 101, and a platen roller cover 102. The platen roller cover 102 is hinged, and swings to expose a platen roller (not shown).

Three indicators 107, 108 and 109 are formed on a top surface of the platen roller cover 102. In this embodiment, the three indicators 107, 108 and 109 are LEDs. The indicator 107 indicates whether the power is ON or OFF. The indicator 108 indicates whether data is being received. The indicator 109 indicates information about the operation of a built-in battery (not shown in FIG. 1), such as whether the built-in battery is being refreshed (i.e., completely discharged) or charged.

Paper for use with the thermal printer 100 is fed into a slot 104 formed between the platen roller cover 102 and the housing 101. An image is formed on the paper using a thermal printing head 40 (see FIG. 2). The paper then exits the thermal printer 100 through a slot 105, formed between the platen roller cover 102 and the housing 101.

A mode switch 106 is located on the top surface of the housing 101. The mode switch 106 is a push button switch and is normally open. By pressing the mode switch 106, various modes of operation of the thermal printer 100 are selected. In the present embodiment, the mode switch 106 also turns the power ON and OFF.

Figure 2:
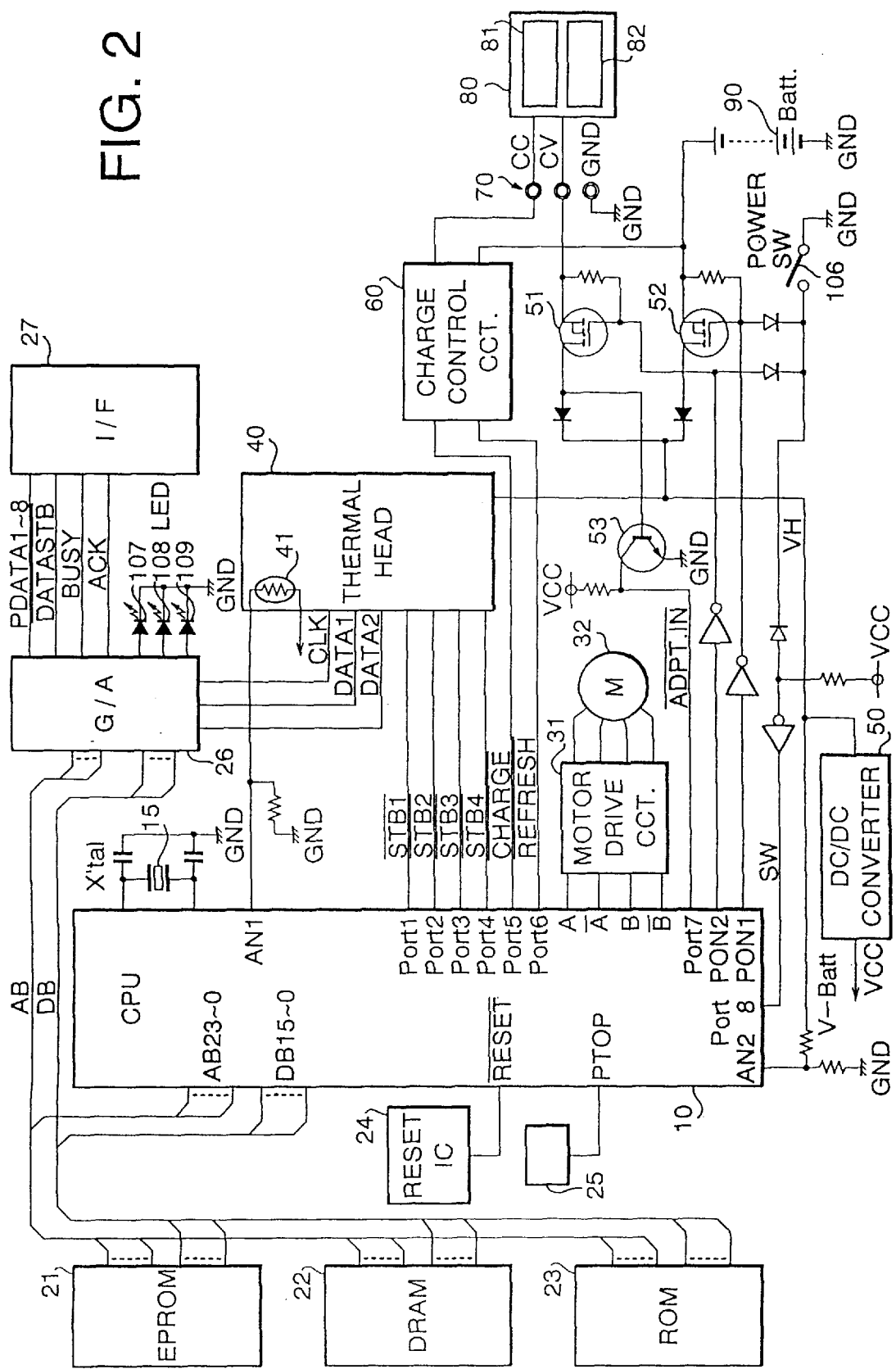
FIG. 2 shows a schematic diagram of the thermal printer shown in FIG. 1.

FIG. 2 is a schematic diagram of the thermal printer 100 shown in FIG. 1.

A CPU 10 controls an operation of the thermal printer 100. In the present embodiment, the CPU 10 is a microprocessor which can address up to 16 MB (megabytes). The CPU 10 transmits address information from address ports AB0 through AB23, along an address bus AB. The CPU 10 transmits and receives data through data ports DB0 through DB15 and a data bus DB. The CPU 10 connects to an EPROM 21, a DRAM 22, a font ROM 23, and a gate array 26, via the address bus AB and data bus DB.

Printer EPROM 21 stores data and software that control the performance, as well as an initial operation of the thermal printer 100 when the power is turned ON. The DRAM 22 (dynamic RAM) has an area where a bit-map of the image is developed, an area for storing data transmitted through an interface 27, and some other work areas. The font ROM 23 stores font data used for developing the bit-mapped image that is stored in the DRAM 22.

The CPU 10 uses a gate array 26 to exchange data through the interface 27, and drive the indicators 107, 108 and 109.

The interface 27 is a printer interface (e.g. Centronics interface) which receives print data and control data from a host computer (not shown). The printer interface has eight data lines PDATA 1 through PDATA 8, and three control lines $\overline{\text{DATASTB}}$, BUSY, and ACK. The eight data lines PDATA 1 through PDATA 8 are used to transfer the print data from the host computer. The $\overline{\text{DATASTB}}$ control line inputs of data to the printer 100 from the host computer. The BUSY control line indicates that the printer 100 cannot accept the print data, while the ACK control line acknowledges reception of the print data. In the specification, a control line, port or signal having a "bar" over its name indicates an active low control line, port or signal, respectively.

A divided voltage V_BATT of the built-in battery (or an external DC voltage) is applied to an analog port AN2 of the CPU 10. The CPU 10 A/D converts the applied analog voltage to a digital value, and detects the voltage of the built-in battery (or external DC source).

A reset IC 24 transmits a reset signal ($\overline{\text{RESET}}$) to a CPU port $\overline{\text{RESET}}$, when the detected voltage level of the battery is lower than a predetermined voltage level. When is the $\overline{\text{RESET}}$ signal in LOW, the CPU 10 stops operation of the printer 100. Therefore, the printing operation stops when the voltage of the built-in battery (or external DC voltage) is below the predetermined level.

A sensor 25, mounted on the platen roller cover 102, detects the presence of the thermosensitive paper in a sheet feed path of the printer 100. If the thermosensitive paper in located in the sheet feed path, the sensor 25 transmits a paper-detect signal to a port PTOP of the CPU 10. By monitoring the port PTOP, the CPU 10 can determine whether the printer 100 has a thermosensitive paper loaded in the sheet feed path, and therefore whether the printer 100 is ready to start the printing operation.

A reference clock signal CLK is generated by crystal 15. In accordance with the reference clock signal CLK, the bit map of the print data is developed in the DRAM 22. The data written in the DRAM 22 is transmitted to the gate array 26 and synchronized with the reference clock signal CLK, before being transferred to the thermal print head 40. The date transferred to the thermal head 40 is separated into two separate data blocks: DATA1 and DATA2.

The thermal print head 40 has a plurality of thermal elements. The heat energy generated by each of the thermal elements is controlled by strobe signals $\overline{\text{STB1}}$, $\overline{\text{STB2}}$, $\overline{\text{STB3}}$, $\overline{\text{STB4}}$ (described later), which are transmitted from the ports Port 1 through Port 4 of the CPU 10. Thus, DATA1 and DATA2 identify the thermal elements to be driven, and strobe signals $\overline{\text{STB1}}$ through $\overline{\text{STB4}}$ drive the identified thermal elements to generate the required heat energy for printing the image.

A thermistor 41 is provided on the thermal head 40 for detecting the temperature of the thermal head 40. The output of the thermistor 41 is input to a port AN1 of the CPU 10. The CPU 10 A/D converts the signal input to the port AN1, and detects the temperature of the thermal head 40.

A motor driving signal is transmitted from ports A, $\overline{\text{A}}$, B, $\overline{\text{B}}$, for controlling a motor driving circuit 31. The motor driving circuit 31 drives a motor 32. The motor driving circuit 31 will be described in more detail later.

A port PON1 outputs a signal for turning ON or OFF a FET 52. A port PON2 outputs a signal for turning ON or OFF a FET 51. If an external power source (such as an AC adapter) is used to power the printer 100, a transistor 53 is turned ON, thereby changing the signal $\overline{\text{ADPT.IN}}$ from High to Low. The CPU 10 monitors the $\overline{\text{ADPT.IN}}$ signal at Port 7, and determines whether the external power supply is connected. If the external power Supply is connected (i.e., $\overline{\text{ADPT.IN}}$ is Low), then the CPU 10 drives the PET 51 through port PON2. If the external power supply is not connected (i.e., $\overline{\text{ADPT.IN}}$ is High), then the CPU 10 drives the FET 52 through port PON1.

When the switch 106 is first turned ON, the FET 51 or 52 is turned ON, as described above. Power is supplied from the external power source or the built-in battery to a DC/DC converter SO. The DC/DC converter 50 outputs vcc which powers the CPU 10, the EPROM 21, the DRAM 22 and the ROM 23. In this embodiment, Vcc=5V.

When the FETs 51 and 52 are turned OFF by the signals output from the Ports PON1 and PON2, power is not supplied to the DC/DC converter 50. Therefore,. the power to the CPU 10 is cut-off and the printer 100 is turned OFF. In order to turn the printer 100 ON, it is necessary to press the switch 106 again, thereby providing power to the FETs 51 and 52.

The built-in battery 90 is a rechargeable battery, such as a Nickel Cadmium battery. The battery 90 supplies 14.4VDC to the printer 100. A power source connector 70 is provided to connect the external power source, such as an AC adapter 80, to the printer 100. The AC adapter 80 includes a constant current source 81 and a constant voltage source 82. An output of the constant current source 81 is connected to a battery charge control circuit 60, and in used to recharge the battery 90. An output of the constant voltage source 82, is connected to an input of the DC/DC converter 50.

As described above, the constant current source 81 is part of the AC adapter 80, and not in the printer 100, since the constant current source 81 is only required for charging the battery. Therefore, the size and weight of the printer 100 is reduced.

To maximize the efficiency of charging the battery 90, the battery 90 is first refreshed (completely discharged) before being recharged. This reduces the 'memory' effect of the battery 90. The memory effect of a battery occurs when the battery is recharged without first being fully discharged. That is, if the battery is repeatedly recharged without being fully discharged, the available battery capacity is reduced.

In the present embodiment, the refreshing of the battery 90 is controlled by the charging circuit 60. When the battery is to be refreshed, the CPU 10 transmits a $\overline{\text{REFRESH}}$ signal from the Port 6 to the charge control circuit 60. The charge control circuit 60 stops charging the battery 90. The FET 51 is turned OFF, and the FET 52 is turned ON. The FET 52 connects the battery 90 to a load (not shown) to refresh the battery 90.

In the present embodiment, the charging of the battery 90 is also controlled by the charging circuit 60. When the battery is to be charged, the CPU 10 transmits a $\overline{\text{CHARGE}}$ signal from the Port 5. The charge control circuit 60 starts charging the battery 90 using the constant current source 81 of the AC adapter 80. The voltage of the battery 90 is monitored by the CPU 10, to determine when to stop the charging operation.

The thermal head 40 has 2560 thermal elements arranged along a line, having a length equivalent to a width of one sheet of the thermosensitive paper used in the printer 100. Print data for the first through the 1280st thermal element are grouped as the DATA1, while print data for the 1281st through the 2560th thermal element are grouped as the DATA2. Further, as described above, the data DATA1 and DATA2 are transferred to the thermal head 40 synchronously with the reference clock signal CLK.

The thermal elements are divided into four groups, with each group driven by the strobe signals $\overline{\text{STB1}}$, $\overline{\text{STB2}}$, $\overline{\text{STB3}}$, and $\overline{\text{STB4}}$. respectively. With this arrangement the number of thermal elements driven at one time may be varied in accordance with the power available form the battery 90. If the power available from the battery 90 is low, then each group of thermal elements may be driven sequentially. However, if the battery 90 is fully charged or the AC adapter 80 is used, all four groups of thermal elements may be driven simultaneously.

Figure 3:
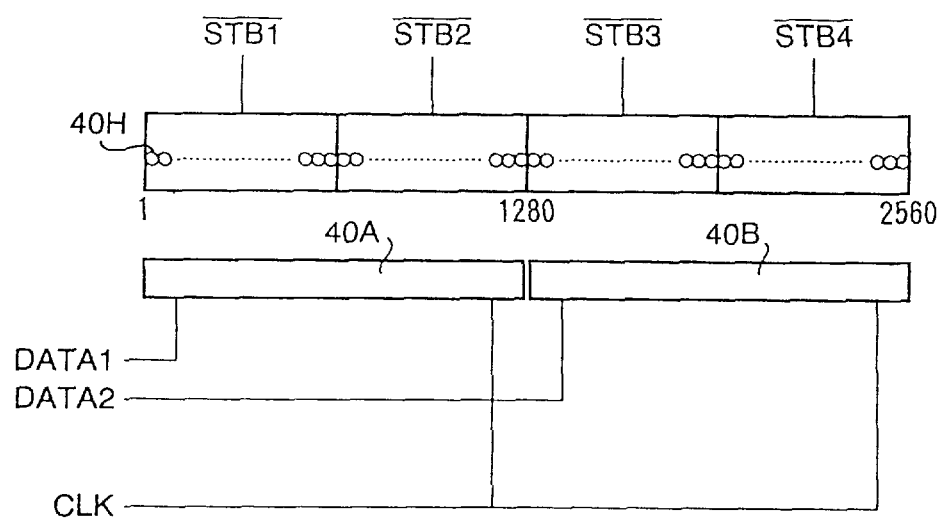

FIG. 3 illustrates a structure of the thermal head 40. Data used to drive the first through 1280th thermal elements 40H is sent from the CPU 10 to the shift register 40A synchronously with the clock signal CLK. Similarly data used to drive the 1281st through 2560th thermal elements 40H is sent from the CPU 10 to the shift register 40B synchronously with the clock signal CLK. Each bit of the shift registers 40A and 40B store data which drives one of the thermal elements 40H. If the data value of the bit stored in the shift register is "1", then the corresponding thermal element is driven (i.e., turned ON) when the strobe signal $\overline{\text{STBn}}$ in LOW.

Figure 4:
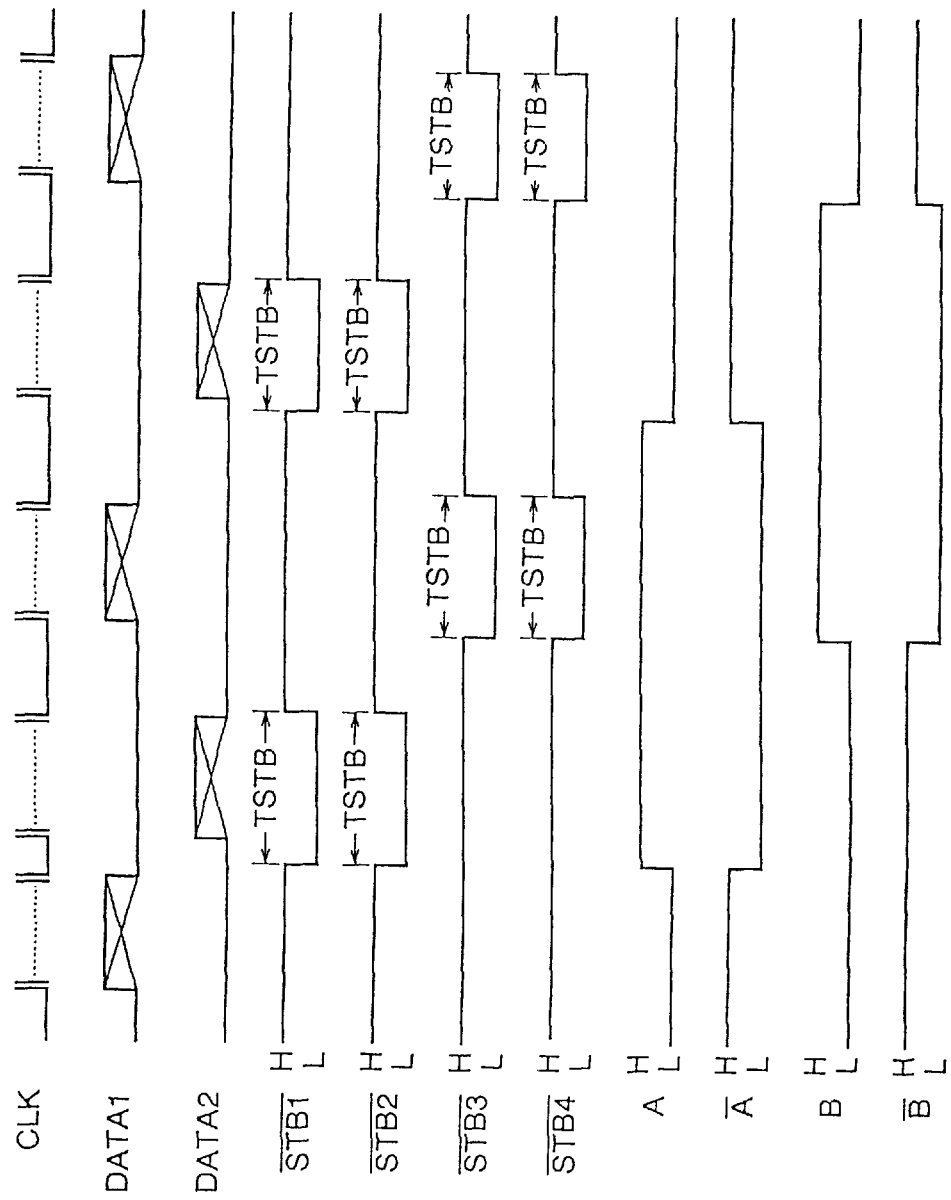
FIG. 4 is a timing diagram of the control of the thermal head and motor.

FIG. 4 is a timing diagram showing the transfer of data to the thermal head 40, the driving of the thermal head 40 and the driving of the motor 32.

After a bit map has been developed in the DRAM 22, the data to be printed by the thermal elements 40H is transmitted from the gate array 26 to the shift registers 40A and 40B. Initially DATA1 which corresponds to the data to drive the first through 1280th thermal elements 40H is transmitted synchronously with the clock signal CLK, and stored in the shift register 40A. After DATA1 has been stored, the strobe signals $\overline{\text{STB1}}$ and $\overline{\text{STB2}}$ are made LOW for a predetermined time interval to drive the first through 1280th thermal elements 40H. Simultaneously, the motor 32 is driven to feed the thermal sheet a predetermined amount.

When the strobe signals $\overline{\text{STB1}}$ and $\overline{\text{STB2}}$ are Low, the first through 1280th thermal elements 40H are driven. Further, DATA2 which corresponds to the data to drive the 1281st through 2560th thermal elements 40H, is transmitted synchronously during time interval TSTB, and stored in the shift register 40B. Therefore, after driving the strobe signals $\overline{\text{STB1}}$ and $\overline{\text{STB2}}$, DATA2, which has been stored in shift register 40B, is transferred to the respective thermal elements 40H. Thus, during the next time interval TSTB, the strobe signals $\overline{\text{STB3}}$ and $\overline{\text{STB4}}$ are tied LOW, and the 1281st through 2560th thermal elements 40H are driven. Further, during the next time interval TSTB, DATA1 for the next line is transferred to the shift register 40A, and the above process repeats. Subsequent lines are printed in a similar manner.

In the present embodiment, a two phase exciting method is used to drive the motor 32. Motor driving pulses A, $\overline{\text{A}}$, B, and $\overline{\text{B}}$ are sent from the CPU 10 to the motor 32 in one of two states, HIGH or LOW. Initially the states of the motor driving pulses are as follows: A=LOW, $\overline{\text{A}}$=HIGH, B=LOW, and $\overline{\text{B}}$=HIGH. Then when the states of two of the motor driving pulses (i.e., A and $\overline{\text{A}}$) are changed, the motor 32 feeds the thermal printer half a line. As shown in FIG. 4, the states of driving pulses A and $\overline{\text{A}}$ are changed while the strobe signals $\overline{\text{STB1}}$ and $\overline{\text{STB2}}$ are LOW. Then, while the strobe signals $\overline{\text{STB3}}$ and $\overline{\text{STB4}}$ are LOW, the states of motor driving pulses B and $\overline{\text{B}}$ are changed, and the motor 32 feeds the thermal paper another half line. The thermal printer is then ready to accept the next set of data to be printed.

If the data to be printed (i.e., DATA1 or DATA2) has a low printing ratio, then the thermal elements 40H can be driven as described above. However, in case DATA1 or DATA2 has a high printing ratio, the driving of the strobe signals $\overline{\text{STB1}}$, $\overline{\text{STB2}}$, $\overline{\text{STB3}}$, and $\overline{\text{STB4}}$ is modified as described below.

Figure 5:
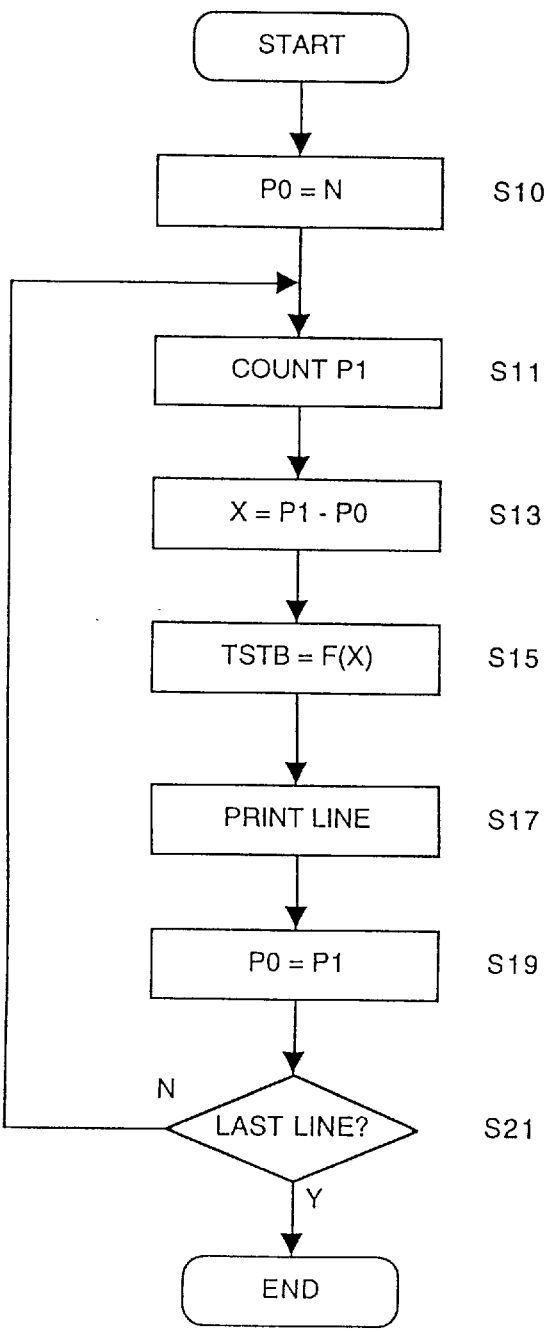
FIG. 5 shows a flowchart of the control of the thermal printer shown in FIG. 1.

FIG. 5 shows a flowchart of an operation of the thermal printer according to the present invention.

Initially, in step S10, the printing ratio P0 of the previous line printed is set equal to N. Initially N has a value of 0 (zero).

At step S11, the data to be printed (i.e., DATA1 or DATA2) in examined to determine number of thermal elements to be driven by counting the number of 1's (ones) (representing black dots) in the data stored in the register 40A or 40B. The printing ratio P1 is the ratio of the number of thermal elements to be driven (black dots to be formed) to the total number of thermal elements (total number of black dots that can be formed).

In step S13, the difference in the printing ratios of the line to be printed and the previous line, is calculated using the following equations:

$$X = P1 - P0$$

Then in step S15, the strobe pulse width TSTB is determined. The strobe pulse width TSTB is a function of the difference X, i.e., TSTB=F(X). In the present embodiment, the function F(X) is given by the equations below:

$$F(X) = T0 - 10X (X \geq 0)$$

$$F(X) = T0 (X < 0)$$

where X=P1−P0, and expressed as a percent, and T0 is strobe width (in μsec) when a normal printing operation is performed.

As shown by the above equation, if the printing ratio of the present line is less than the printing ratio of the previous line, then TSTB=T0, since the sticking phenomenon is not a problem in this case.

For, example, if the printing ratio PI of the line to be printed is 80%, and the printing ratio of the previous line is 20%. and T0=3000 μsec, then TSTB=3000−10 (80−20)=2400 μsec.

Therefore, the pulse width is decreased, and the thermal elements to be driven are energized for a shorter time in order to print the line, in step 817. Therefore, the heat output of the thermal elements is reduced and sticking is prevented.

Then in step S19, the previous printing ratio P0 is set equal to the present printing ratio. Stop S21 determines whether there in any more data to be printed. If there in no more data to be printed (S21:Y), the printing operation is terminated. Otherwise, control returns to step 11.

As described above, if the current line to be printed has a higher printing ratio than a previously printed line, printing normally forms a darker image and the thermosensitive paper may stick to the thermal head.

However, according to the present invention, when the printing ratio of the current line to be printed is higher than the printing ratio of the previously printed line, the driving time of the strobe pulse which energizes the thermal elements is reduced. Heat produced by the thermal head is accordingly reduced, and the sticking phenomenon is prevented. Further, this results in the image appearing as if it has been printed normally.

The present disclosure relates to subject matter contained in Japanese Patent Application No. HEI 6-150305 filed on Jun. 8, 1994 which in expressly incorporated herein by reference in its entirety.

What is claimed is:

1. A thermal printer for forming an image on a sheet, said thermal printer comprising:
   a thermal head having a plurality of linearly arranged thermal elements;
   means for driving said plurality of thermal elements to form a line image;
   means for determining a total number of said plurality of thermal elements to be energized to form said line image;
   means for calculating a difference between a first number of said plurality of thermal elements to be energized to form said line image, and a second number of said plurality of thermal elements that were energized to form a previous line image; and
   means for controlling said driving means to drive said plurality of thermal elements for a period of time, said period of time being a function of said difference between said first number and said second number calculated by said calculating means.

2. The thermal printer according to claim 1, wherein said image has a plurality of lines, each of said lines having image data, said image data divided into a plurality groups.

3. The thermal printer according to claim 2, wherein said plurality of thermal elements are arranged in a plurality of groups, each of said plurality of groups being driven according to a corresponding group of said image data.

4. The thermal printer according to claim 1, wherein said total number of said thermal elements to be driven, determined by said determining means, corresponds to a printing ratio of said line to be printed.

5. The thermal printer according to claim 1, wherein when said first number is less than said second number, said controlling means controls said driving means to drive said thermal elements for a predetermined period of time.

6. The thermal printer according to claim 5, wherein when said first number is greater than said second number, said controlling means controls said driving means to drive said thermal elements for a period of time which is less than said predetermined period of time.

7. The thermal printer according to claim 1, wherein said sheet is a thermosensitive sheet.

8. The thermal printer according to claim 1, wherein said controlling means controls a width of a strobe pulse used by said driving means to vary a time period that said thermal elements are driven said strobe pulse width having a maximum value.

9. The thermal printer according to claim 8, wherein when said first number is greater than said second number, said width of said strobe pulse is less than said maximum value.

10. The thermal printer according to claim 9, wherein when said first number is not greater than said second number, said width of said strobe pulse is equal to said maximum value.

11. The thermal printer according to claim 1, wherein said means for driving can selectively drive one of all of said plurality of thermal elements and a portion of said plurality of thermal elements.

12. A method for forming an image on a sheet by driving a thermal head having a plurality of linearly arranged thermal elements, said image having a plurality of line image data, said method comprising the steps of:
    determining a total number of said thermal elements to be energized to form said line image;
    calculating a difference between said total number, and a previous number of said thermal elements that were energized to form a previous line image; and
    driving said thermal elements for a period of time, to form said line image, said period of time being a function of said difference calculated by said calculating step.

13. The method according to claim 12, wherein said driving step controls a width of a strobe pulse used in the driving of said thermal elements, said strobe pulse width having a maximum value.

14. The method according to claim 13, wherein when said total number is greater than said previous, number, said driving step drives said strobe pulse at a width less than said maximum value.

15. The method according to claim 12, wherein said total number of said thermal elements to be driven, determined by said determining step, corresponds to a printing ratio of said line to be printed.

16. The method for forming an image on a sheet according to claim 12, wherein driving said thermal elements includes selectively driving one of all of said total number of thermal elements and a portion of said total number of thermal elements.

17. A thermal printer for forming an image on a sheet, said thermal printer comprising:
    a thermal head having a plurality of linearly arranged thermal elements;
    means for driving said thermal elements to form a line image;
    means for determining a total number of said thermal elements to be energized to form said line image;
    means for storing said total number of said thermal elements to be energized; and
    means for controlling said driving means to drive said thermal elements for a period of time, said period of time being a function of said total number of said thermal elements to be energized to form said line image and said previous total number of said thermal elements energized to form a previous line.

18. The thermal printer according to claim 17, wherein said means for driving can selectively drive one of all of said plurality of thermal elements and a portion of said plurality of thermal elements.

* * * * *